United States Patent
Ko et al.

(10) Patent No.: US 10,069,181 B2
(45) Date of Patent: Sep. 4, 2018

(54) METAL-AIR BATTERY HAVING AIR PURIFICATION MODULE AND METHOD OF OPERATING THE METAL-AIR BATTERY

(71) Applicant: Samsung Electronics Co., Ltd., Suwon-si, Gyeonggi-do (KR)

(72) Inventors: Jeongsik Ko, Seongnam-si (KR); Hyukjae Kwon, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 301 days.

(21) Appl. No.: 14/750,189

(22) Filed: Jun. 25, 2015

(65) Prior Publication Data
US 2016/0064786 A1 Mar. 3, 2016

(30) Foreign Application Priority Data
Aug. 26, 2014 (KR) .................. 10-2014-0111631

(51) Int. Cl.
*H01M 12/08* (2006.01)
*H01M 4/38* (2006.01)
*H01M 8/0662* (2016.01)
*H01M 8/0668* (2016.01)

(52) U.S. Cl.
CPC .......... *H01M 12/08* (2013.01); *H01M 4/382* (2013.01); *H01M 8/0668* (2013.01); *H01M 8/0687* (2013.01); *Y02E 60/128* (2013.01)

(58) Field of Classification Search
CPC .. H01M 12/08; H01M 8/0687; H01M 8/0668; H01M 4/382; Y02E 60/18
See application file for complete search history.

(56) References Cited

U.S. PATENT DOCUMENTS

| 5,529,607 A | 6/1996 | Tan |
| 7,875,101 B2 | 1/2011 | Staiger et al. |
| 2005/0022670 A1* | 2/2005 | Dallas ............... B01D 53/0415 96/108 |
| 2012/0094193 A1* | 4/2012 | Albertus ............... H01M 12/08 429/339 |
| 2013/0106359 A1 | 5/2013 | Noda et al. |

(Continued)

FOREIGN PATENT DOCUMENTS

| KR | 1020120112401 A | 10/2012 |
| KR | 1020130055635 A | 5/2013 |

OTHER PUBLICATIONS

Scholes et al., Carbon Dioxide Separation through Polymeric Membrane Systems for Flue Gas Applications, 2008, Recent Patens on Chemical Engineering, Jan. 2008, pp. 52-66.*

(Continued)

*Primary Examiner* — Eugenia Wang
(74) *Attorney, Agent, or Firm* — Cantor Colburn LLP

(57) ABSTRACT

A metal-air battery including: a battery cell module for generating electricity by oxidizing a metal and reducing oxygen; and an air purification module in fluid communication with the battery cell module for purifying air, wherein a first portion of the air purification module is configured to supply purified air to the battery cell module, and a second portion of the air purification module is configured to receive air discharged from the battery cell module.

11 Claims, 6 Drawing Sheets

(56) References Cited

U.S. PATENT DOCUMENTS

2014/0045080 A1* 2/2014 Albertus ............... H01M 12/08
429/405

OTHER PUBLICATIONS

Kevin G. Gallagher, et al.; Quantifying the Promise of Lithium-Air Batteries for Electric Vehicles; Energy Environ. Sci., Mar. 24, 2014; Royal Society of Chemistry; pp. 1-17; DOI: 10.1039/C3EE43870H.
Ziyang Guo, et al.; Humidity Effect on Electrochemical Performance of Li—O2 Batteries; Journal of Power Sources 264; Elsevier; Apr. 26, 2014; pp. 1-7.

* cited by examiner

METAL-AIR BATTERY HAVING AIR PURIFICATION MODULE AND METHOD OF OPERATING THE METAL-AIR BATTERY

CROSS REFERENCE TO RELATED APPLICATION

This application claims priority to and the benefit of Korean Patent Application No. 10-2014-0111631, filed on Aug. 26, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a metal-air battery and a method of operating the metal-air battery.

2. Description of the Related Art

Metal-air batteries each include a plurality of metal-air battery cells, and each metal-air battery cell includes a negative electrode capable of intercalating/deintercalating ions and a positive electrode using oxygen from the air as an active material. A reduction/oxidation reaction of oxygen introduced from outside the battery occurs at the positive electrode, and an oxidation/reduction reaction of a metal occurs at the negative electrode. Then, electric energy is obtained from the conversion of chemical energy generated by such reactions. For example, a metal-air battery absorbs oxygen when being discharged and emits oxygen when being charged. As described above, since metal-air batteries use oxygen present in air, the energy density of the metal-air batteries may be greater than other types of batteries. For example, the energy density of metal-air batteries may be several times higher than the energy density of lithium ion batteries.

In addition, since there is a lower possibility of metal-air batteries catching on fire due to abnormal high-temperature conditions, metal-air batteries have excellent stability, and since metal-air batteries are operated through only absorption/discharge of oxygen without having to use a heavy metal, metal-air batteries may cause less environmental pollution. Owing to the above-mentioned various characteristics, much research into metal-air batteries has currently been conducted.

When a metal-air battery is operated, air is supplied to a positive electrode of the metal-air battery so that oxygen molecules can be used as an active material. At this time, impurities included in the air such can hinder battery processes, and thus the capacity and lifespan of the metal-air battery are decreased. Thus there remains a need for an improved battery to provide improved capacity and lifetime.

SUMMARY

Provided is a metal-air battery including an air purification module.

Provided is a method of operating a metal-air battery.

Additional aspects will be set forth in part in the description which follows and, in part, will be apparent from the description.

According to an aspect, a metal-air battery includes: a battery cell module for generating electricity by oxidizing a metal and reducing oxygen; and an air purification module in fluid communication with the battery cell module for purifying air, wherein a first portion of the air purification module is configured to supply purified air to the battery cell module, and a second portion of the air purification module is configured to receive air discharged from the battery cell module.

The air purification module may include a first adsorption tower and a second adsorption tower, wherein while the first adsorption tower performs a role of purifying air and then supplying the purified air to the battery cell module, the second adsorption tower may perform a role of receiving air discharged from the battery cell module so as to be regenerated, and the first and second adsorption towers may periodically exchange the roles thereof.

The first and second adsorption towers may be not in direct fluid communication with each other but may be in only indirect fluid communication with each other through the battery cell module.

The first and second adsorption towers may be in direct fluid communication with each other blockably and controllably and may be in indirect fluid communication with each other through the battery cell module.

The air purification module may be configured to be operated by using a pressure swing adsorption (PSA) method, a thermal swing adsorption (TSA) method, a pressure thermal swing adsorption (PTSA) method, a vacuum swing adsorption (VSA) method, a selective separation method, or a combination of at least two thereof.

The air purification module may include at least one of an adsorbent and a selectively permeable membrane.

The adsorbent may be selected from zeolite, alumina, silica gel, a metal-organic framework (MOF), a zeolitic imidazolate framework (ZIF), active carbon, or a mixture of at least two thereof.

The selectively permeable membrane may include a plurality of parallel ion exchange hollow fiber membranes.

The metal-air battery may be a lithium-air battery.

According to an aspect, a method of operating a metal-air battery includes alternately repeating a first half cycle and a second half cycle, wherein the first half cycle includes:
introducing ambient air into the first adsorption tower to form purified air;
supplying the purified air to the battery cell module; and
supplying air discharged from the battery cell module to the second adsorption tower to regenerate the second adsorption tower, and wherein the second half cycle includes:
introducing ambient air into the second adsorption tower to form purified air;
supplying the purified air to the battery cell module; and
supplying discharged air discharged from the battery cell module to the first adsorption tower to regenerate the first adsorption tower to operate the metal-air battery, wherein the metal air battery includes a battery cell module for generating electricity by oxidizing a metal and reducing oxygen, and an air purification module in fluid communication with the battery cell module, wherein the air purification module includes a first portion including the first adsorption tower and a second portion including the second adsorption tower.

In the first half cycle, about 100 volume percent (vol %) of air discharged from the first adsorption tower may not be directly supplied to the second adsorption tower but may be supplied to the battery cell module, and in the second half cycle, about 100 vol % of air discharged from the second adsorption tower may not be directly supplied to the first adsorption tower but may be supplied to the battery cell module.

In the first half cycle, about 50 vol % to about 100 vol % of the air discharged from the battery cell module may be supplied to the second adsorption tower, and 0 vol % to about 50 vol % of the air discharged from the battery cell module may be discharged outside, and in the second half cycle, about 50 vol % to about 100 vol % of the air discharged from the battery cell module may be supplied to the first adsorption tower, and about 0 vol % to about 50 vol % of the air discharged from the battery cell module may be discharged outside.

The first half cycle may further include supplying only a portion of air purified by the first adsorption tower to the battery cell module and a remaining portion of the air directly to the second adsorption tower without going through the battery cell module therebetween, and the second half cycle may further include supplying only a portion of air purified by the second adsorption tower to the battery cell module and a remaining portion of the air directly to the first adsorption tower without going through the battery cell module therebetween.

In the first half cycle, about 50 vol % to less than 100 vol % of air discharged from the first adsorption tower may be supplied to the battery cell module, greater than about 0 vol % to about 50 vol % of the air discharged from the first adsorption tower may be supplied to the second adsorption tower, about 50 vol % to about 100 vol % of air discharged from the battery cell module may be supplied to the second adsorption tower, and about 0 vol % to about 50 vol % of the air discharged from the battery cell module may be discharged outside; and in the second half cycle, about 50 vol % to less than about 100 vol % of air discharged from the second adsorption tower may be supplied to the battery cell module, greater than about 0 vol % to about 50 vol % of the air discharged from the second adsorption tower may be supplied to the first adsorption tower, about 50 vol % to about 100 vol % of air discharged from the battery cell module may be supplied to the first adsorption tower, and about 0 vol % to about 50 vol % of the air discharged from the battery cell module may be discharged outside.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
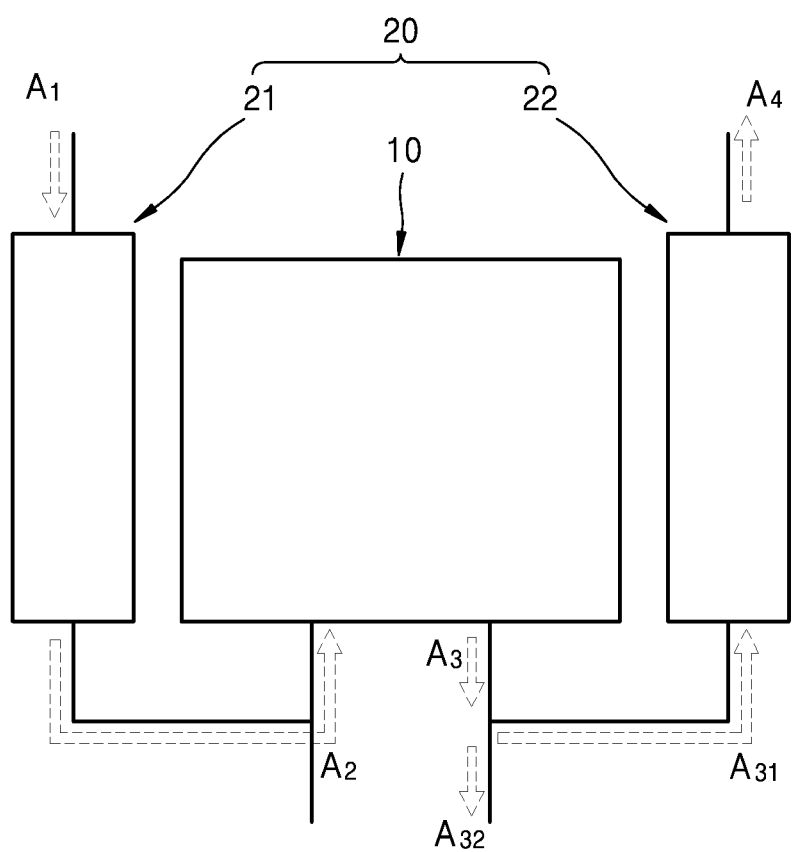
FIG. 1 is a schematic view illustrating an embodiment of a metal-air battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal-air battery and a method of operating the metal-air battery will be disclosed in further detail with reference to FIG. 1.

Referring to FIG. 1, an embodiment of the metal-air battery comprises a battery cell module 10 and an air purification module 20.

The battery cell module 10 generates electricity by oxidation of a metal and reduction of oxygen. For example, if the metal is lithium, and while not wanting to be bound by theory, during discharge of the metal-air battery, electricity is generated while lithium peroxide (e.g., $Li_2O_2$) is produced by a reaction between lithium (Li) and oxygen as shown in the following reaction Formula 1:

$$Li + \tfrac{1}{2}O_2 \rightarrow \tfrac{1}{2}Li_2O_2 \qquad \text{Formula 1}$$

However, if moisture is present in the air, and while not wanting to be bound by theory, it is understood that the energy density and lifespan of the metal-air battery can be decreased due to a reaction for producing lithium hydroxide (LiOH) as shown in the following reaction Formula 2:

$$4Li + 6H_2O + O_2 \rightarrow 4(LiOH \cdot H_2O) \qquad \text{Formula 2}$$

The air purification module 20 is in fluid communication with the battery cell module 10.

A first portion of the air purification module 20, e.g., first adsorption tower 21, is used to purify the ambient air A1 by removing impurities such as moisture and/or carbon dioxide from the ambient air A1 to provide purified air A2, which is directed to the battery cell module 10.

In addition, a second portion of the air purification module 20, e.g., second adsorption tower 22, is regenerated by receiving regeneration air A31, which is at least a portion of the discharge air A3, which is discharged from the battery cell module 10. In the present disclosure, the term "regeneration" refers to the recovery of the air purification ability of the air purification module 20 by detaching or discharging impurities, such as water or carbon dioxide, which may be adsorbed to or captured by the air purification module 20.

The air purification module 20 includes a first adsorption tower 21 and a second adsorption tower 22.

The first and second adsorption towers 21 and 22 each independently comprise an absorbent, a selectively permeable membrane, or a combination thereof. An adsorbent (not shown) may be disposed in each of the first and second adsorption towers 21 and 22, respectively, or a selectively permeable membrane (not shown) may be disposed in each of the first and second adsorption towers 21 and 22, to purify the air. Alternatively, both the adsorbent and the selectively permeable membrane may be disposed in each of the first and second adsorption towers 21 and 22, respectively. In another embodiment, one of the first and the second adsorption towers comprises the adsorbent and the other of the first and second adsorption towers comprises selectively permeable membrane.

The adsorbent selectively adsorbs impurities contained in the ambient air A1. The adsorbent may comprise a zeolite, alumina, silica gel, a metal-organic framework (MOF), a zeolitic imidazolate framework (ZIF), active carbon, or a combination thereof.

In the present disclosure, the term "MOF" refers to a crystalline compound comprising metal ions or clusters coordinated to organic molecules to form one-, two-, or three-dimensional structures that are porous. The metal ion of the MOF can be Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, or Bi, and a ligand of the MOF may comprise multidentate functional groups, and may be terephthalate, 1,4-benzenedicarboxylate, or adamantane tetracarboxylate, for example. Representative MOF absorbents include compounds of the formula $M_2$(2,5-dioxido-1,4-benzenedicarboxylate) wherein M=Mg, Mn, Fe, Co, Cu, Ni or Zn.

Furthermore, in the present disclosure, the term "ZIF" refers to a nano-porous compound comprising tetrahedral clusters of the formula $M'N_4$ (where M' denotes a metal, e.g., Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, or Bi) linked by imidazolate ligands.

The selectively permeable membranes allow oxygen in the ambient air A1 to pass therethrough and block impurities contained in the ambient air A1, such as $H_2O$ or $CO_2$. Each of the selectively permeable membranes may include a plurality of ion exchange hollow fiber membranes wherein the hollow fibers are arranged in parallel to each other (in a flow direction of the ambient air A1).

While the first adsorption tower 21 performs a role of purifying ambient air A1 and supplying the purified air A2 to the battery cell module 10, the second adsorption tower 22 may receive regeneration air A31, which is at least a portion of the discharge air A3, which is discharged from the battery cell module 10, so as to be regenerated. To provide for continuous operation, the roles of the first and second adsorption towers 21 and 22 may be periodically exchanged.

The metal-air battery may alternately repeat a first half cycle and a second half cycle that together form a full cycle.

In the first half cycle, as shown in FIG. 1, the first adsorption tower 21 may purify ambient air A1 and then supply the purified air A2 to the battery cell module 10, and the second adsorption tower 22 may be regenerated by receiving the regeneration air A31, which is at least a portion of the discharge air A3, which is discharged from the battery cell module 10. Thus a first portion of the air purification module, which comprises the first adsorption tower, may be is configured to supply purified air to the battery cell module, and a second portion of the air purification module, which comprises the second adsorption tower, may be configured to receive air discharged from the battery cell module.

In the second half cycle (not shown), the second adsorption tower 22 may purify air and then supply the purified air to the battery cell module 10, and the first adsorption tower 21 may be regenerated by receiving at least a portion of air discharged from the battery cell module 10. Thus the second portion of the air purification module may be configured to supply purified air to the battery cell module, and the first portion of the air purification module may be configured to receive air discharged from the battery cell module.

The first half cycle and the second half cycle may be alternately repeated at a selected time interval, (of, for example, at a time interval of about 5 seconds to about 20 hours, or about 10 seconds to about 2 hours, or about 30 seconds), to provide for effectively continuous operation. Thus the first and second portions of the battery cell module may be configured to periodically switch between supplying purified air to the battery cell module and receiving air discharged from the battery cell module.

As shown in FIG. 1, the first and second adsorption towers 21 and 22 may not be in direct fluid communication with each other, and may be in only indirect fluid communication with each other through the battery cell module 10.

The air purification module 20 may be configured to be operated by a pressure swing adsorption (PSA) method, a thermal swing adsorption (TSA) method, a pressure thermal swing adsorption (PTSA) method, a vacuum swing adsorption (VSA) method, a selective separation method, or a combination thereof. In the present disclosure, the term "PSA" refers to a technique in which a gas is preferentially adsorbed onto or captured by an adsorbent at a relatively high partial pressure thereof and then the adsorbed or captured gas is released or discharged from the adsorbent when the partial pressure of the gas is reduced. In addition, the term "TSA" refers to a technique in which a gas is preferentially adsorbed onto or captured by an adsorbent at room temperature and then the adsorbed or captured gas is released or discharged from the adsorbent when the temperature is increased. The term "PTSA" refers to a combination of PSA and TSA, and the term "VSA" refers to a technique in which a gas is preferentially adsorbed onto or captured by an adsorbent at around atmospheric pressure and then the adsorbed or captured gas is released or discharged from the adsorbent under a vacuum.

The metal-air battery has a high efficiency because a selected quantity of the purified air A2, e.g., 100 percent of the flow on a volumetric basis (vol %), or about 50 vol % to 100 vol %, or about 55 vol % to about 95 vol %, of the flow of the purified air, which is purified by the air purification module 20 (for example, the first adsorption tower 21), is supplied to the battery cell module 10, and the air purification module 20 has a high regeneration efficiency because a large amount of the discharge air A3, e.g., about 50 volume percent (vol %) to 100 vol %, or about 55 vol % to about 95 vol % of the flow of the discharge air A3, based on a total flow of the discharge air A3, is used to regenerate the air purification module 20 (for example, the second adsorption tower 22) and the temperature of the regeneration air A31 is higher than ambient temperature (e.g., about 25° C.). The reason why the temperature of the regeneration air A31 is higher than ambient temperature is because heat is generated when the battery cell module 10 is operated.

The metal-air battery may be a lithium-air battery. However, the metal-air battery is not limited thereto. For example, the metal-air battery may be a sodium-air battery, a zinc-air battery, a potassium-air battery, a calcium-air battery, a magnesium-air battery, an iron-air battery, an aluminum-air battery, or a battery in which the negative electrode comprises an alloy of sodium, zinc, potassium, calcium, magnesium, iron, aluminum, or a combination thereof.

Hereinafter, a method of operating the metal-air battery will be disclosed in further detail with reference to FIG. 1.
First Half Cycle First, ambient air A1 is introduced into the first adsorption tower 21. Then, the first adsorption tower 21 adsorbs or captures impurities, such as moisture and/or carbon dioxide contained in the ambient air A1, to produce purified air A2.

The purified air A2 is not directly supplied to the second adsorption tower 22, and about 60 vol % to 100 vol %, or about 70 vol % to about 95 vol %, or about 80 vol % to about 90 vol % of the flow of the purified air A2 is supplied to the battery cell module 10 so that oxygen contained in the purified air A2 may be used as a positive electrode active material.

Thereafter, at least a portion of the discharge air A3, which is discharged from the battery cell module 10, is supplied to the second adsorption tower 22 as regeneration air A31 to be used for regeneration of the second adsorption tower 22. The amount of the regeneration air A31 may be about 50 vol % to 100 vol %, or 60 vol % to 90 vol %, based on a total flow the discharge air A3. Since the regeneration air A31 is discharged from the battery cell module 10, the temperature of the regeneration air A31 is relatively high (for example, about 40° C. to about 100° C., or about 45° C. to about 95° C.), and thus the regeneration efficiency of the second adsorption tower 22 may be enhanced. In an embodiment a temperature of the second adsorption tower 22 is about 5° C. to about 100° C., or about 10° C. to about 95° C. greater than a temperature of the first adsorption tower. The remaining portion of the discharge air A3, which is discharged from the battery cell module 10 to provide discharge exhaust air A32, is discharged to the outside of the metal-air battery (for example, to the atmosphere). The amount of the discharge exhaust air A32 may be 0 vol % to about 50 vol %, or about 5 vol % or about 45 vol %, based on the total flow of the of the discharge air A3. In the present disclosure, the term "amount of air" may be determined volumetrically, e.g., using the volumetric flow rate of air.

Regeneration exhaust air A4 is discharged from the second adsorption tower 22, and is discharged to the outside of the metal-air battery (for example, to the atmosphere).
Second Half Cycle A second half cycle (not shown in FIG. 1) may be performed as follows. The second half cycle may be performed using the same principle as that used in the first half cycle.

First, ambient air is introduced into the second adsorption tower 22 and is purified.

About 50 vol % to 100 vol %, or about 55 vol % to about 95 vol %, preferably 100 vol %, based on a total flow of the purified air, is supplied to the battery cell module 10 so that oxygen contained in the purified air may be used as a positive electrode active material.

Thereafter, at least a portion (for example, about 50 vol % to 100 vol %, or about 60 vol % to about 90 vol %) of the flow of the air discharged from the battery cell module 10 is supplied to the first adsorption tower 21 to be used for regeneration of the first adsorption tower 21. The remaining portion (for example, 0 vol % to about 50 vol %) of the air discharged from the battery cell module 10 is discharged to the outside of the metal-air battery (for example, to the atmosphere).

Air discharged from the first adsorption tower 21 may be discharged to the outside of the metal-air battery (for example, to the atmosphere).

Operation after Second Half Cycle

The first half cycle and the second half cycle may be alternately repeated at a selected time interval (of, for example, about 5 seconds to about 20 hours, or about 10 seconds to about 2 hours, or about 30 seconds).

Hereinafter, a metal-air battery and a method of operating the metal-air battery according to another embodiment will be disclosed in further detail with reference to FIG. 2.

Figure 2:
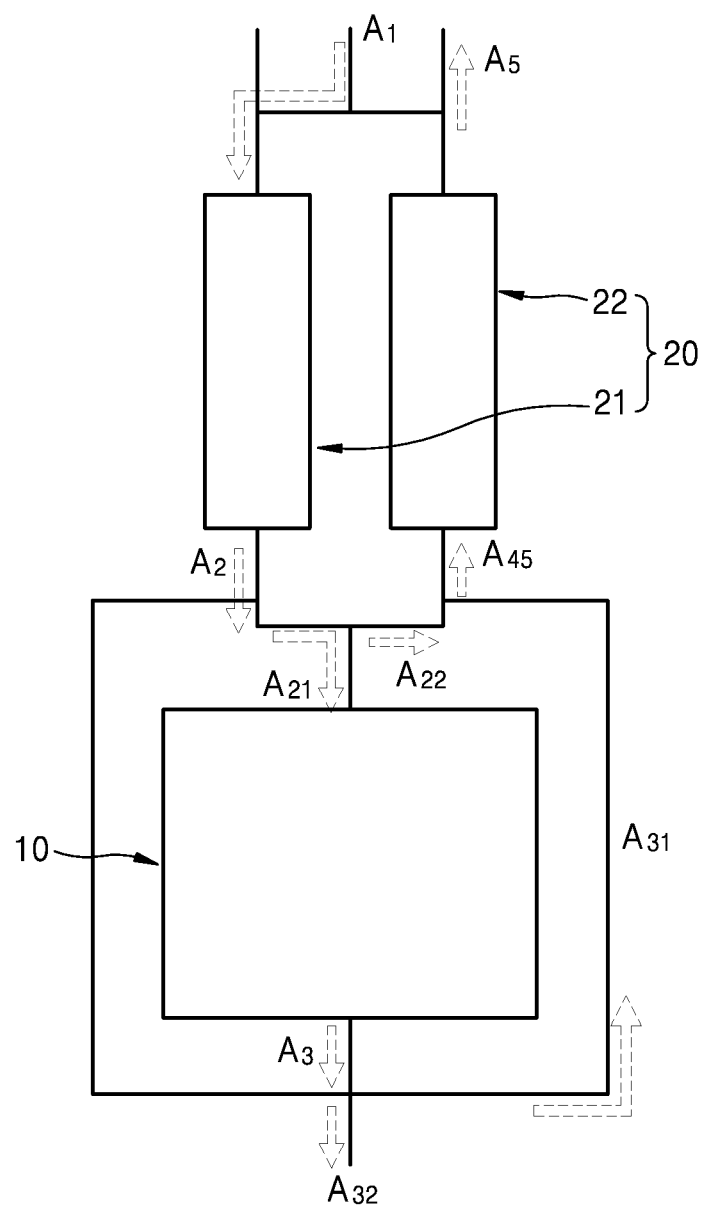
FIG. 2 is a schematic view illustrating another embodiment of a metal-air battery.

Referring to FIG. 2, the metal-air battery includes a battery cell module 10 and an air purification module 20.

The metal-air battery illustrated in FIG. 2 is different from the metal-air battery illustrated in FIG. 1, in that the first and second adsorption towers 21 and 22 may be in direct fluid communication with each other blockably and controllably, e.g., by including a valve to provide fluidic control, and may be in indirect fluid communication with each other through the battery cell module 10. In the present disclosure, the expression "the first and second adsorption towers 21 and 22 are in direct fluid communication with each other blockably and controllably" is used to denote that the first and second adsorption towers 21 and 22 may be in direct fluid communication with each other without the flow going through the battery cell module 10, wherein the direct fluid communication between the first and second adsorption towers 21 and 22 can be blocked, e.g., by closing a valve disposed between the first and second adsorption towers 21 and 22, and when the first and second adsorption towers 21 and 22 are in direct fluid communication with each other the amount (e.g., volumetric flow rate) of a fluid (e.g., air) flowing in a direction from the first adsorption tower 21 to the second adsorption tower 22 or in a reverse direction can be selected, e.g., by selection of a state of a valve, or with a flow control device such as a mass or volume flow controller or a check-valve.

In an example, a portion of the purified air A2, which is purified by the first adsorption tower 21 is supplied to the battery cell module 10 to provide positive purified air A21, and the remaining portion of the purified air A2, i.e., purified regeneration air A22, may be supplied directly to the second adsorption tower 22 without going through the battery cell module 10.

In another example, about 50 volume percent (vol %) to 100 vol %, or about 55 vol % to about 95 vol %, preferably 100 vol %, based on a total flow of the purified air A2, which is purified by the first adsorption tower 21, may be supplied to the battery cell module 10 as positive purified air A21. In this case, the amount of the purified air A2 may be equal to the amount of the positive purified air A21, and the amount of the purified regeneration air A22 may be zero (0).

Hereinafter, a method of operating the metal-air battery will be disclosed in further detail with reference to FIG. 2.

First Half Cycle

First, ambient air A1 is introduced into the first adsorption tower 21. Then, the first adsorption tower 21 adsorbs or captures impurities, such as moisture and/or carbon dioxide contained in the ambient air A1, to produce purified air A2.

At least a portion of the purified air A2 is supplied to the battery cell module 10 to provide positive purified air A21 so that oxygen contained in the positive purified air A21 may be used as a positive electrode active material, and a remaining portion of the purified air A2, if any, i.e., the purified regeneration air A22, may be supplied directly to the second adsorption tower 22 without going through the battery cell module 10, and combined with discharge regeneration air A31 (further described later) and to form regeneration air A45. The regeneration air A4 is supplied to the second adsorption tower 22 so as to be used for regeneration of the second adsorption tower 22. The amount of the positive purified air A21 may be about 50 vol % to 100 vol %, or about 60 vol % to about 90 vol % of the amount of the flow of the purified air A2, and the amount of the purified regeneration air A22 may be 0 vol % to about 50 vol %, or about 10 vol % to about 40 vol % of the amount of the flow of the purified air A2, each based on a total flow of the purified air.

Thereafter, at least a portion of the discharge air A3, which is discharged from the battery cell module 10, is supplied to the second adsorption tower 22 as discharge regeneration air A31, to be mixed with purified regeneration air A22, which is a portion of the purified air A2 discharged from the first adsorption tower 21, so as to form regeneration air A45. The regeneration air A45 is supplied to the second adsorption tower 22 to be used for regeneration of the second adsorption tower 22. The amount of the discharge regeneration air A31 may be about 50 vol % to 100 vol %, or about 60% to about 90 vol %, based on a total flow of the discharge air A3. Since the discharge regeneration air A31 is discharged from the battery cell module 10, the temperature of the discharge regeneration air A31 is relatively high (for example, about 40° C. to about 100° C., about 45° C. to about 95° C.), and thus the regeneration efficiency of the second adsorption tower 22 may be enhanced. In an embodiment a temperature of the second adsorption tower 22 is about 5° C. to about 100° C., or about 10° C. to about 95° C. greater than a temperature of the first adsorption tower. The remaining portion of the discharge air A3, which discharged from the battery cell module 10, i.e., discharge exhaust air A32, is discharged to the outside of the metal-air battery (for example, to the atmosphere). The amount of the discharge exhaust air A32 may be 0 vol % to about 50 vol %, or about 5 vol % to about 40 vol %, of the amount of the discharge air A3, based on a total flow of the discharge air A3.

Regeneration exhaust air A5, which is discharged from the second adsorption tower 22, is discharged to the outside of the metal-air battery (for example, to the atmosphere).

Second Half Cycle

A second half cycle (not shown in FIG. 2) is performed as follows. The second half cycle is performed using the same principle as that used in the first half cycle.

First, ambient air is introduced into the second adsorption tower 22 so as to be purified.

At least a portion of the purified air is supplied to the battery cell module 10 so that oxygen contained in the portion of the purified air may be used as a positive electrode active material, and a remaining portion of the purified air, if any, may be directly supplied to the first adsorption tower 21 without going through the battery cell module 10 so as to be mixed with air (described later) discharged from the battery cell module 10. The mixed air is supplied to the first adsorption tower 21 so as to be used for regeneration of the first adsorption tower 21.

Thereafter, at least a portion (for example, about 50 vol % to 100 vol %) of the discharge air flow (referred to as 100 vol %) discharged from the battery cell module 10, based on a total flow of the discharge air, is supplied to the first adsorption tower 21 so as to be used for regeneration of the first adsorption tower 21. The remaining portion (for example, 0 vol % to about 50 vol %, or about 10 vol % to about 50 vol %) of the discharge air flow (100 vol % air) discharged from the battery cell module 10, based on a total flow of the discharge air, is discharged to the outside of the metal-air battery (for example, to the atmosphere).

Air discharged from the first adsorption tower 21 is discharged to the outside of the metal-air battery (for example, to the atmosphere).

Operation after a Second Half Cycle

The first half cycle and the second half cycle may be alternately repeated at regular time intervals (of, for example, about 5 seconds to about 20 hours, or about 10 seconds to about 10 hours, or about 30 seconds). In an embodiment, the first and second portions of the battery cell module are configured to periodically switch between supplying purified air to the battery cell module and receiving air discharged from the battery cell module.

Hereinafter, the battery cell module 10 included in the metal-air batteries illustrated in FIGS. 1 and 2 will be further disclosed with reference to FIG. 3.

Figure 3:
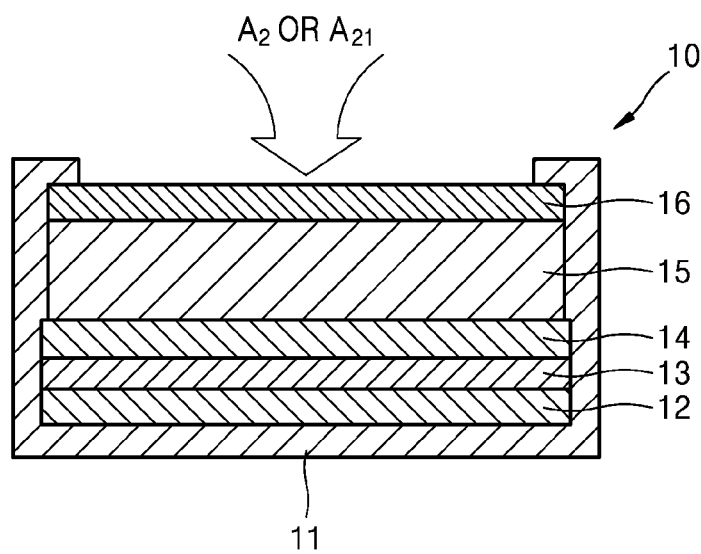
FIG. 3 is a schematic cross-sectional view illustrating an embodiment of a battery cell module included in the metal-air batteries of FIGS. 1 and 2.

Referring to FIG. 3, the battery cell module 10 includes a housing 11, a negative electrode metal layer 12, a negative electrode electrolyte layer 13 disposed on the negative electrode metal layer 12, an oxygen blocking layer 14 disposed on the negative electrode electrolyte layer 13, a positive electrode layer 15 disposed on the oxygen blocking layer 14, and a gas diffusion layer 16 disposed on the positive electrode layer 15.

The housing 11 accommodates and then seals the negative electrode metal layer 12, the negative electrode electrolyte layer 13, the oxygen blocking layer 14, the positive electrode layer 15, and the gas diffusion layer 16.

The negative electrode metal layer 12 has a function of incorporating and deincorporating, e.g., alloying and dealloying or intercalating and deintercalating metal ions. For example, the negative electrode metal layer 12 may include lithium (Li), sodium (Na), zinc (Zn), potassium (K), calcium (Ca), magnesium (Mg), iron (Fe), aluminum (Al), an alloy comprised of at least one of the foregoing, or a combination thereof.

The negative electrode electrolyte layer 13 delivers metal ions to the positive electrode layer 15 through the oxygen blocking layer 14. To this end, the negative electrode electrolyte layer 13 may include an electrolyte.

In an example, the electrolyte may comprise a solid electrolyte including a polymer electrolyte, an inorganic electrolyte, or a combination thereof, and may be prepared to have flexibility.

In another example, the electrolyte may be prepared by dissolving a metal salt in a solvent.

The metal salt may include a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$ or lithium bis(trifluoromethanesulfonyl)imide) (LiTFSI). In addition to the lithium salt, the metal salt may further include another metal salt such as $AlCl_3$, $MgCl_2$, $NaCl$, $KCl$, $NaBr$, $KBr$, or $CaCl_2$.

The solvent may be any suitable solvent capable of dissolving the above-listed lithium salts and metal salts. For example, the solvent may include a carbonate-based solvent such as dimethyl carbonate (DMC), an ester-based solvent such as methyl acetate, an ether-based solvent such as dibutyl ether, a ketone-based solvent such as cyclohexanone, an amine-based solvent such as triethylamine, a phosphine-based solvent such as triethylphosphine, or a combination thereof.

The oxygen blocking layer 14 may not allow oxygen to pass therethrough and may be conductive with respect to metal ions. The oxygen blocking layer 14 may include a flexible polymer material. For example, the oxygen blocking layer 14 may be a porous separator including: a nonwoven polymer fabric such as a nonwoven polypropylene fabric or a nonwoven polyphenylene sulfide fabric; a porous olefin-based film such as a porous polyethylene film or a porous polypropylene film; or a combination thereof.

The oxygen blocking layer 14 and the negative electrode electrolyte layer 13 may be formed as separate layers, or a single layer by impregnating pores of a porous separator having an oxygen blocking ability with an electrolyte. For example, the negative electrode electrolyte layer 13 and the oxygen blocking layer 14 may be integrated to a single layer by impregnating pores of a porous separator with an electrolyte prepared by mixing polyethylene oxide (PEO) and LiTFSI.

The positive electrode layer 15 may include an electrolyte for conducting metal ions, a catalyst for oxidation and reduction of oxygen, a conductive material, and a binder. For example, the electrolyte, the catalyst, the conductive material, and the binder may be mixed together, and a solvent may be added to the mixture to form positive electrode slurry. Thereafter, the positive electrode slurry may be applied to the oxygen blocking layer 14 and dried to form the positive electrode layer 15. The solvent may be the same as the solvent used to prepare the electrolyte included in the negative electrode electrolyte layer 13.

The electrolyte included in the positive electrode layer 15 may include the same lithium salt as that which is included in the negative electrode electrolyte layer 13 and optionally another metal salt.

The catalyst may include an oxide of a metal selected from platinum (Pt), gold (Au), silver (Ag), manganese (Mn), nickel (Ni), cobalt (Co), an alloy of at least one thereof, or a combination thereof.

The conductive material may include: a porous carbon-based material such as carbon black, graphite, graphene, active carbon, carbon fiber, or carbon nanotubes; conductive metal powder such as copper powder, silver powder, nickel powder, or aluminum powder; a conductive organic material such as a polyphenylene derivative; or a combination thereof.

The binder may include polytetrafluoroethylene (PTFE), polypropylene, polyvinylidene fluoride (PVDF), polyethylene, styrene-butadiene rubber, or a combination thereof.

The gas diffusion layer 16 uniformly supplies the purified air A2 (refer to FIG. 1) or the positive purified air A21 (refer to FIG. 2) to the positive electrode layer 15.

The gas diffusion layer 16 may include a porous metallic material, a porous ceramic material, a porous polymer material, a porous carbon material, or a combination thereof. Since the gas diffusion layer 16 has a porous structure, the gas diffusion layer 16 may absorb purified air A2 (refer to FIG. 1) or the positive purified air A21 (refer to FIG. 2) discharged from the air purification module 20 and may easily diffuse the air into cavities C (refer to FIG. 4 or 5) that will be further disclosed later.

The porous metallic material may be a porous metal having a sponge-like structure or a metal fiber mat.

The porous ceramic material may be magnesium-aluminum silicate.

The porous polymer material may be porous polyethylene or porous polypropylene.

Examples of the porous carbon material may include carbon paper, carbon cloth, and carbon felt that comprise carbon fibers.

Hereinafter, the gas diffusion layer 16 included in the battery cell module 10 illustrated in FIG. 3 will be disclosed in more detail with reference to FIG. 4.

Figure 4:
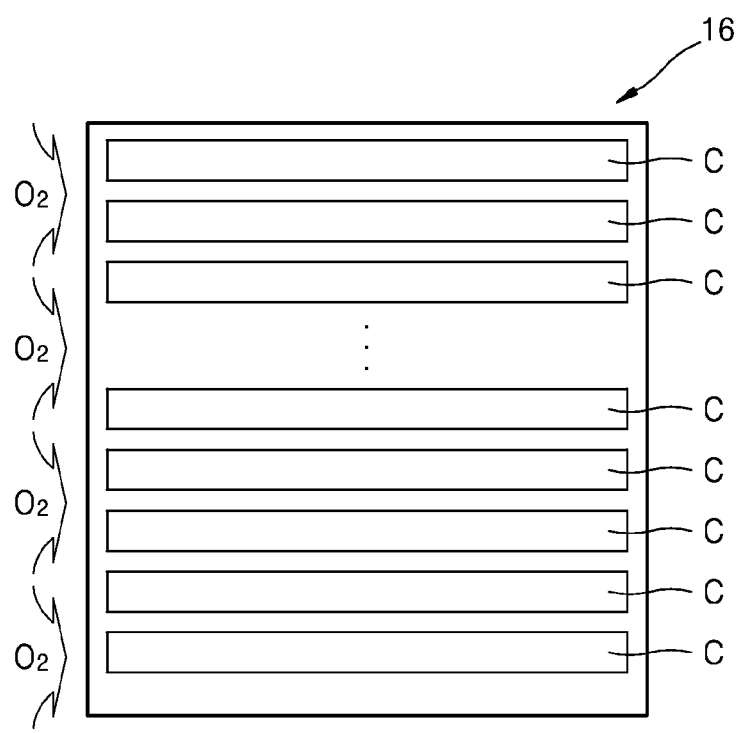
FIG. 4 is a plan view illustrating an embodiment of a gas diffusion layer of the battery cell module illustrated in FIG. 3.

Referring to FIG. 4, the gas diffusion layer 16 includes a plurality of cavities C having a rectangular hole shape and arranged side by side in a line.

Purified air A2 or positive purified air A21 introduced into the cavities C may make direct contact with an upper surface of the positive electrode layer 15. The introduced purified air A2 or ambient A1 contains oxygen. Therefore, the positive electrode layer 15 easily makes contact with the oxygen.

Hereinafter, another example of the gas diffusion layer 16 will be described in further detail with reference to FIG. 5.

Figure 5:
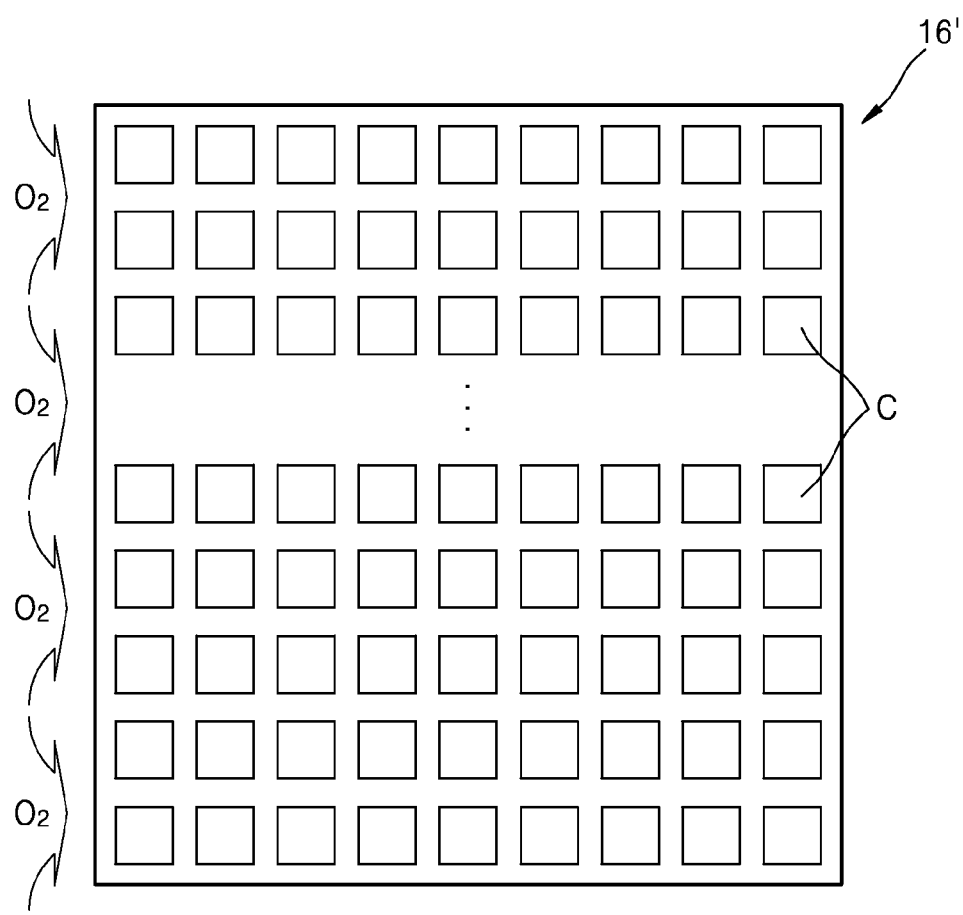
FIG. 5 is a plan view illustrating another embodiment of a gas diffusion layer.

Referring to FIG. 5, a gas diffusion layer 16' includes a plurality of cavities C having a square hole shape and arranged in a matrix form.

The battery cell module 10 included in the disclosed metal-air battery is not limited to the above-described structures. That is, the battery cell module 10 may have various structures.

Hereinafter, the present disclosure will be further described in the following examples. However, this disclosure shall not be limited thereto.

EXAMPLES

Manufacturing Example: Manufacture of Air Purification Module

The air purification module 20 included in the metal-air battery illustrated in FIG. 2 was manufactured. The first adsorption tower 21 and the second adsorption tower 22 were filled with zeolite (Zeorum A-3 by Tosoh corporation). Each of the first and second adsorption towers 21 and 22 had a diameter of 3.4 centimeters (cm), a length of 15 cm, and a thickness of 2.5 mm and was formed of polycarbonate.

Example: Operation of Air Purification Module

Figure 6A:
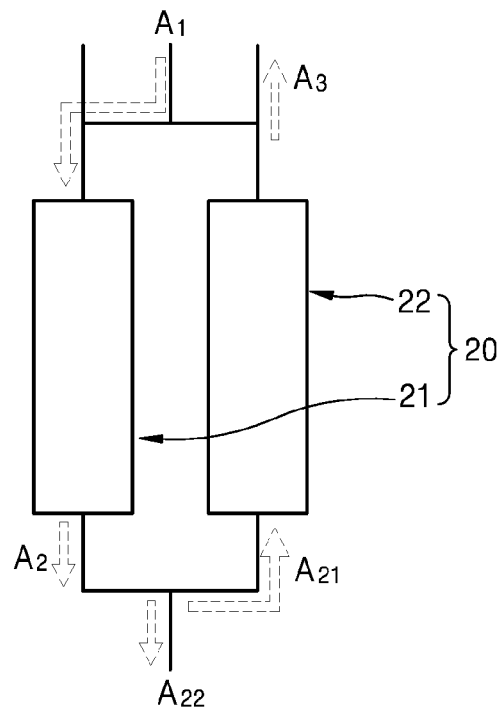
FIGS. 6A and 6B are views illustrating an embodiment of a method for evaluating the air purification performance of an air purification module of the metal-air battery illustrated in FIG. 2.
Figure 6B:
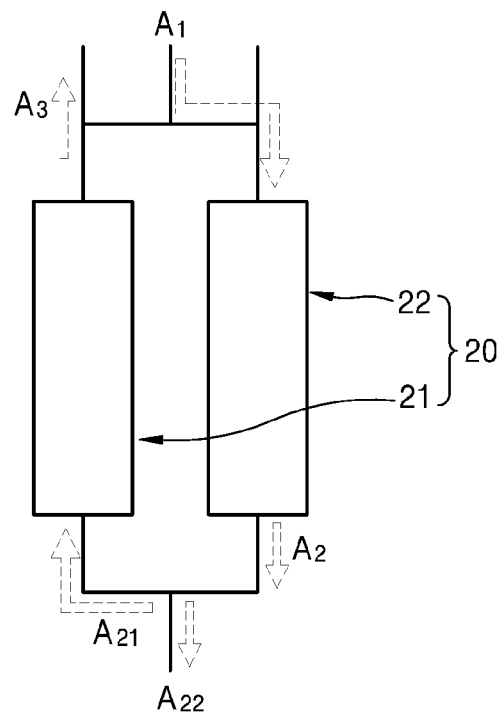

The air purification module 20 manufactured as described above was operated for 30 seconds by an operation method shown in FIG. 6A (a first half cycle), and then for 30 seconds by an operation method shown in FIG. 6B (a second half cycle). Thereafter, the first half cycle and the second half cycle were alternatively repeated. At that time, for illustrative purposes only, the first and second adsorption towers 21 and 22 were operated at room temperature (about 25° C.) and atmospheric pressure (about 1 atm).

Referring to FIG. 6A, in the first half cycle, ambient air A1 was supplied to the first adsorption tower 21 at a flow rate of 20 liters per minute (L/min). Thereafter, positive purified air (denoted by A21) corresponding to about 80 vol % of the ambient air A2 discharged from the first adsorption tower 21 was supplied to the second adsorption tower 22 at a flow rate of about 16 L/min to regenerate the second adsorption tower 22, and purified regeneration air A22 corresponding to about 20 vol % of the purified air A2 discharged from the first adsorption tower 21 was discharged to the atmosphere at a flow rate of about 4 L/min. Discharge air A3 discharged from the second adsorption tower 22 was also discharged to the atmosphere.

Referring to FIG. 6B, in the second half cycle, ambient air A1 was supplied to the second adsorption tower 22 at a flow rate of 20 L/min. Thereafter, air (denoted by A21) corresponding to about 80 vol % of the purified air A2 discharged from the second adsorption tower 22 was supplied to the first adsorption tower 21 at a flow rate of about 16 L/min to regenerate the first adsorption tower 21, and the purified regeneration air A22, corresponding to about 20 vol % of the purified air A2, which was discharged from the second adsorption tower 22, was discharged to the atmosphere at a flow rate of about 4 L/min. Discharge air A3 discharged from the first adsorption tower 21 was also discharged to the atmosphere.

Comparative Example: Operation of Air Purification Module

The air purification module 20 was operated in the same manner as in the previous Example except that the flow rate of air A21 supplied to the second adsorption tower 22 in the first half cycle to regenerate the second adsorption tower 22 was changed to 10 L/min, and the flow rate of the positive purified air A21 supplied to the first adsorption tower 21 in the second half cycle to regenerate the first adsorption tower 21 was changed to 10 L/min.

Evaluation Example

Figure 7:
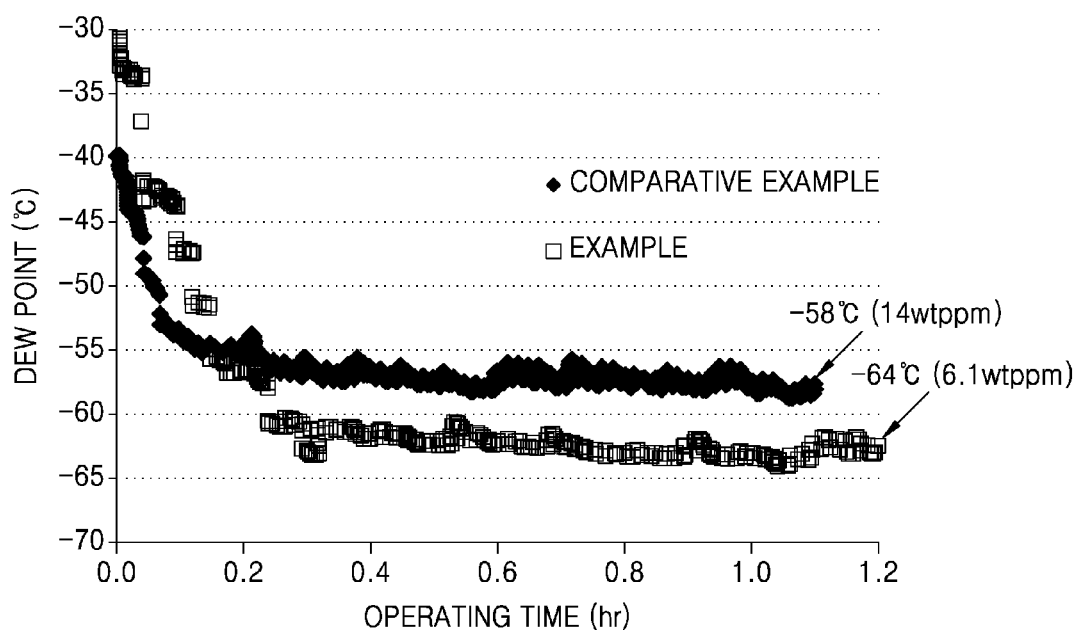
FIG. 7 is a graph of dew point (° C.) versus operating time (hours) illustrating the dew point of air purified by the air purification module with respect to an operation time when the air purification module is operated under different conditions by the operation method illustrated in FIGS. 6A and 6B.

While operating the air purification module 20 by the methods of the Example and the Comparative Example, purified regeneration air A22 discharged to the outside from the first adsorption tower 21 or the second adsorption tower 22 as shown in FIGS. 6A and 6B was intermittently sampled to measure the dew point of the purified regeneration air A22 as shown in a graph of FIG. 7. In addition, the moisture content of the purified regeneration air A22 was measured at the end point as shown in the graph of FIG. 7. Table 1 below shows the dew point and moisture content of the purified regeneration air A22 at the end point in the graph of FIG. 7. The dew point was measured using a dew point meter (DMT-152 by VAISALA).

TABLE 1

| | Example | Comparative Example |
|---|---|---|
| Dew point (° C.) | −64 | −58 |
| Moisture content (wtppm) | 6.1 | 14 |

Referring to FIG. 7 and Table 1, when the air purification module 20 was operated according to the Example, the dew point and moisture content of purified air A2 and the purified regeneration air A22 were relatively low when compared to the case in which the air purification module 20 was operated according to the Comparative Example. That is, the purification efficiency of the air purification module 20 was relatively high in the Example when compared to the Comparative Example. From these results, it could be understood that the air purification performance of the air purification module 20 is enhanced as the amount of purified air A2 used for regeneration is increased.

As described above, according to the one or more of the above exemplary embodiments, the efficiency of the metal-air battery may be improved by increasing the amount of air supplied to the battery cell module, and along with this, the regeneration efficiency of the air purification module may be improved by increasing the amount and temperature of air used to regenerate the air purification module.

It should be understood that the exemplary embodiments described herein should be considered in a descriptive sense only and not for purposes of limitation. Descriptions of features, advantages or aspects within each exemplary embodiment should be considered as available for other similar features, advantages, or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal-air battery comprising:
a battery cell module for generating electricity by oxidizing a metal and reducing oxygen; and
an air purification module in fluid communication with the battery cell module for purifying air,
wherein a first portion of the air purification module comprises a first adsorption tower configured to adsorb impurities from air and supply purified air to the battery cell module, and a second portion of the air purification module comprises a second adsorption tower configured to receive air discharged from the battery cell module,
wherein the first adsorption tower comprises a first adsorbent and the second adsorption tower comprises a second adsorbent, and the first and second adsorbents each absorb carbon dioxide, and
wherein the first and second adsorption towers of the air purification module are configured to switch between supplying purified air to the battery cell module and receiving air discharged from the battery cell module.

2. The metal-air battery of claim 1, wherein the first and second adsorption towers are in indirect fluid communication with each other through the battery cell module.

3. The metal-air battery of claim 1, wherein the first and second adsorption towers are blockably and controllably in direct fluid communication with each other and are in indirect fluid communication with each other through the battery cell module.

4. The metal-air battery of claim 1, wherein the air purification module is configured to be operated by a pressure swing adsorption method, a thermal swing adsorption method, a pressure thermal swing adsorption method, a vacuum swing adsorption method, a selective separation method, or a combination thereof.

5. The metal-air battery of claim 4, wherein the air purification module further comprises a selectively permeable membrane.

6. The metal-air battery of claim 5, wherein the selectively permeable membrane comprises a plurality of parallel ion exchange hollow fiber membranes.

7. The metal-air battery of claim 1, wherein the first adsorbent and the second adsorbent independently comprise zeolite, alumina, silica gel, a metal-organic framework, a zeolitic imidazolate framework, active carbon, or a combination thereof.

8. The metal-air battery of claim 1, wherein the metal-air battery is a lithium-air battery.

9. The metal-air battery of claim 1, wherein a temperature of the air discharged from the battery cell module to the second adsorption tower of the second portion of the air purification module is about 5° C. to about 100° C. greater than a temperature of the purified air supplied by the first adsorption tower of the first portion of the air purification module.

10. The metal-air battery of claim 1, wherein the impurities comprise water, carbon dioxide, or a combination thereof.

11. The metal-air battery of claim 10, wherein the second adsorption tower is configured to receive the air discharged from the battery cell module to regenerate the second adsorption tower, and wherein the first and second portions of the air purification module are configured to switch between supplying purified air to the battery cell module, receiving the air discharged from the battery cell module, and regenerating the battery cell module.

* * * * *